United States Patent
Karame

(10) Patent No.: US 9,613,250 B2
(45) Date of Patent: Apr. 4, 2017

(54) METHOD AND SYSTEM FOR BIOMETRICAL IDENTIFICATION OF A USER

(75) Inventor: Ghassan Karame, Heidelberg (DE)

(73) Assignee: NEC CORPORATION, Tokyo (JP)

(*) Notice: Subject to any disclaimer, the term of this patent is extended or adjusted under 35 U.S.C. 154(b) by 8 days.

(21) Appl. No.: 14/404,483

(22) PCT Filed: Sep. 5, 2012

(86) PCT No.: PCT/EP2012/067340
§ 371 (c)(1),
(2), (4) Date: Feb. 3, 2015

(87) PCT Pub. No.: WO2014/037037
PCT Pub. Date: Mar. 13, 2014

(65) Prior Publication Data
US 2015/0186709 A1     Jul. 2, 2015

(51) Int. Cl.
G06K 9/00 (2006.01)
H04L 9/32 (2006.01)
G06F 21/44 (2013.01)
G06F 21/32 (2013.01)

(52) U.S. Cl.
CPC ......... *G06K 9/00087* (2013.01); *G06F 21/32* (2013.01); *G06F 21/44* (2013.01); *G06K 9/00006* (2013.01); *G06K 9/00597* (2013.01); *H04L 9/3231* (2013.01); *G06F 2211/007* (2013.01)

(58) Field of Classification Search
None
See application file for complete search history.

(56) References Cited

U.S. PATENT DOCUMENTS

| 6,141,436 A * | 10/2000 | Srey | G06K 9/00013 340/5.74 |
| 2003/0105725 A1* | 6/2003 | Hoffman | G06F 21/32 705/75 |
| 2004/0255168 A1* | 12/2004 | Murashita | G06K 9/00885 726/5 |
| 2005/0055557 A1 | 3/2005 | Yamada et al. | |
| 2005/0204149 A1 | 9/2005 | Watanabe | |
| 2011/0302420 A1* | 12/2011 | Davida | G06F 21/32 713/180 |

OTHER PUBLICATIONS

Cavoukian, Ann, and Alex Stoianov. Biometric encryption: A positive-sum technology that achieves strong authentication, security and privacy. Information and Privacy Commissioner, Ontario, 2007.*

* cited by examiner

*Primary Examiner* — Kim Vu
*Assistant Examiner* — Nathan Bloom
(74) *Attorney, Agent, or Firm* — Leydig, Voit & Mayer, Ltd.

(57) ABSTRACT

A method for biometrical identification of a user includes receiving, as an input, biometrical properties of a user, and encoding the biometrical properties. The encoded biometrical properties are checked with corresponding provided biometrical user information, Based on a result of the check, the user is identified and a response of the identification is outputted. Prior to encoding, the biometrical properties are encrypted, The encoded biometrical properties are provided as a biometrical challenge. The biometrical challenge is decrypted for performing the check. A verification of the response is provided for.

19 Claims, 2 Drawing Sheets

METHOD AND SYSTEM FOR BIOMETRICAL IDENTIFICATION OF A USER

CROSS-REFERENCE TO PRIOR APPLICATIONS

This application is a U.S. National Stage Application under 35 U.S.C. §371 of International Application No. PCT/EP2012/067340 filed on Sep. 5, 2012. The International Application was published in English on Mar. 13, 2014 as WO 2014/037037 A1 under PCT Article 21(2).

FIELD

The present invention relates to a method for biometrical identification of a user, comprising the steps of:
a) Inputting biometrical properties of a user,
b) Encoding the biometrical properties,
c) Checking the encoded biometrical properties with corresponding provided biometrical user information,
d) Identifying the user based on a result of step c), and
e) Outputting a response of the identification according to step d).

The present invention further relates a system for biometrical identification of a user comprising a first terminal comprising:
a) an input interface for biometrical properties of a user,
b) an encoding module for encoding the inputted biometrical properties,
c) a sender unit for sending the encoded biometrical properties to a checking entity,
d) a receiver unit for receiving a response of an identification of the user and
e) an output interface for outputting the response,
wherein the checking entity is connected to the first terminal, and configured to be operable to check the encoded biometrical information with corresponding provided biometrical user information and a database, connected to the first terminal and to the checking entity, wherein the database is configured to provide the biometrical user information.

Although applicable to biometrical properties of users in general, the present invention will be described with regard to fingerprints as the biometrical property of a user.

BACKGROUND

Fingerprint-based identification is gaining more and more popularity, e.g. corresponding fingerprint scanners are cheaper available. Fingerprint-based identification enables users to identify and authenticate themselves to local or remote entities such as login to a local computer or public institutes, electronic portals of governments or the like.

The process of the fingerprint scanning and matching involves a fingerprint scanner, i.e. a device that copies an image of fingerprints. The fingerprint scanner is connected via a network, for example the internet, to a remote database server, for example hosted by a governmental agency. When a user puts one of his fingers on the fingerprint scanner, the fingerprint scanner receives a fingerprint candidate and transmits it via the network to the database server. The database server then uses a fingerprint matching algorithm in order to match the candidate fingerprint to a fingerprint target stored in the database. If a correct target is found, then the database server transmits a response to the fingerprint scanner including the corresponding access policy associated with the correct fingerprint.

Fingerprint scanners are usually installed in trusted environments such as airports, embassies, governmental agencies or the like. The reason is that users are generally reluctant to trust in fingerprint scanners if these scanners are deployed in uncontrolled environments like local shops, supermarkets, etc. Users cannot check if the fingerprint scanners have been tampered with or not. Since those fingerprint scanners temporarily store and transmit personal sensitive material, i.e. fingerprints, there are considerable incentives for attackers to compromise such scanners.

In the non-patent literature of Mauro Barni, Tiziano Bianchi, Dario Catalano, Mario Di Raimondo, Ruggero Donida Labati, Pierluigi Failla, Dario Fiore, Riccardo Lazzeretti, Vincenzo Piuri, Fabio Scotti, Alessandro Piva, Privacy-preserving fingercode authentication, Proceedings of the 12th ACM workshop on Multimedia and security, Sep. 9-10, 2010, Roma, Italy and in the non-patent literature of Yan Huang, Lior Malka, David Evans, Jonathan Katz: Efficient Privay-Presering Biometric Identification, Proceedings of NDSS 2011 a prevention of database servers from learning any information about fingerprints is described while executing a fingerprint matching algorithm. Assuming that the fingerprint scanner is honest or trusted, privacy preserving fingerprint matching algorithms are proposed.

However, the methods described therein rely on trusted fingerprint scanners. It is therefore a disadvantage, that such fingerprint scanners can only be used in a controlled, i.e. secure environment. A further disadvantage is that rogue fingerprint scanners may try to impersonate users and therefore provide an increased risk for stealing personal data.

SUMMARY

In an embodiment, the present invention provides a method for biometrical identification of a user, the method comprising:
a) receiving, as an input, biometrical properties of a user,
b) encoding the biometrical properties,
c) checking the encoded biometrical properties with corresponding provided biometrical user information,
d) identifying the user based on a result of step c),
e) outputting a response of the identification according to step d),
f) encrypting the biometrical properties of the user received as the input prior to step b),
g) providing the encoded biometrical properties as a biometrical challenge,
h) decrypting the biometrical challenge for performing step c), and
i) providing for a verification of the response.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
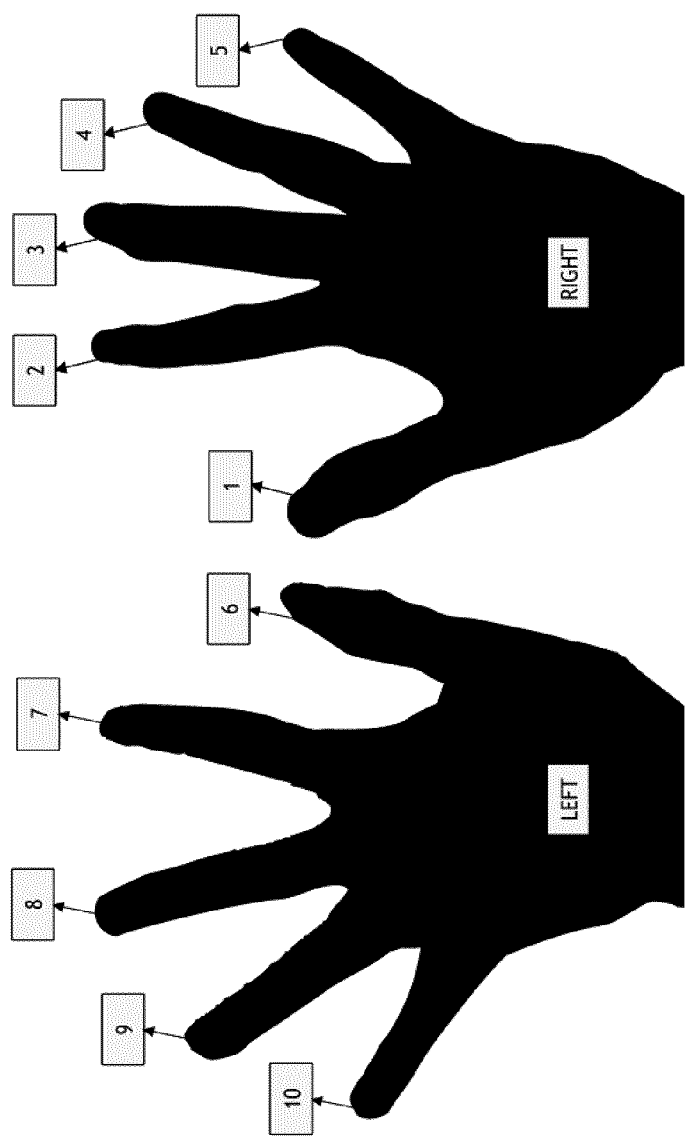
FIG. 1 shows different biometrical property data with corresponding data identifiers according to an embodiment of the present invention.

In an embodiment, the present invention provides a method and a system for biometrical identification of a user which enables obtaining biometrical data in untrusted environments which are more secure.

In an embodiment, the present invention provides a method and a system for biometrical identification of a user which are easy to implement and cost effective.

In an embodiment, the present invention provides a method and a system for biometrical identification of a user which do not penalize non-privacy aware users.

According to an embodiment, the method for biometrical identification of a user, comprises the steps of:
a) Inputting biometrical properties of a user,
b) Encoding the biometrical properties,
c) Checking the encoded biometrical properties with corresponding provided biometrical user information,
d) Identifying the user based on a result of step c), and
e) Outputting a response of the identification according to step d).

According to an embodiment, the method provides that:
f) the inputted biometrical properties of the user are encrypted prior to step b) and that
g) the encoded biometrical properties are provided as a biometrical challenge, and that
h) for performing step c) the biometrical challenge is decrypted, and that
i) the response is verified.

According to an embodiment, the system for biometrical identification of a user, preferably for performing with the method above, comprises a first terminal comprising:
a) an input interface for biometrical properties of a user,
b) an encoding module for encoding the inputted biometrical properties,
c) a sender unit for sending the encoded biometrical properties to a checking entity,
d) a receiver unit for receiving a response of an identification of the user and
e) an output interface for outputting the response, wherein the checking entity is connected to the first terminal, and configured to be operable to check the encoded biometrical information with corresponding provided biometrical user information and a database, connected to the first terminal and to the checking entity, wherein the database is configured to provide the biometrical user information.

According to an embodiment, the system includes a protecting terminal, connected to the first terminal, comprising:
a2) a second input interface for input biometrical properties of a user, and
b2) a second output interface wherein an output interface of the second terminal is connected to the input interface of the first terminal, and being configured to be operable to encrypt the biometrical information and to output the encrypted biometrical information via the second output interface and to provide the encrypted biometrical properties in form of a biometrical challenge and wherein the checking entity is configured to be operable to decrypt the biometrical challenge and by a verifying entity, preferably the user, is configured to be operable to verify the response.

According to an embodiment of the invention, it has first been recognized, that a privacy-preserving biometric extraction in spite of untrusted biometric readers or scanners is enabled.

According to an embodiment of the invention, it has further been first recognized, that a mutual authentication between users and a database without the need to agree on secrets using an untrusted biometric reader is enabled.

According to an embodiment of the invention, it has further been first recognized, that existing biometric readers and operation of databases require only few modifications.

According to an embodiment of the invention, it has further been first recognized, that an impersonation of biometrical data by means of replay attacks is prevented.

Further features, advantages and preferred embodiments are described in the following subclaims.

According to a preferred embodiment the second terminal adds metadata-information, preferably encrypted. One of the advantages is, that the second terminal may add information, for example information about the second terminal itself, to the biometrical information of the user. For example, properties of the second terminal could be implemented in the metadata information so that the database respectively the checking entity could use this information when checking the biometrical information with corresponding stored information. Alternatively or additionally a key for encryption may be included in the metadata-information.

According to a further preferred embodiment lifetime-information of the second terminal are included in the metadata-information. Lifetime-information reflect a "freshness" of the second terminal enabling, for example, to reflect one-time second terminals for encryption which further enhances the security.

According to a further preferred embodiment, different biometrical property data and data identifiers are included in the biometrical raw data, wherein the data identifiers are well-defined and assigned to the different biometrical property data. In case of fingerprints as biometrical property of the user and assumed that the database has stored fingerprints of fingers with corresponding indices a scanned fingerprint pertaining one of these fingers, has a reduced chance that an adversary not knowing a priori the fingerprints of these indices can guess the correct association fingerprint index. Therefore security is further enhanced.

According to a further preferred embodiment, the result of step e) includes, preferably is provided in form of, the identifier corresponding to the checked biometrical information of the biometrical raw data. By providing the result including the identifier a fingerprint scanner may be used to output this result to the user enabling the user to decide if the fingerprint scanner is to be trusted or if the user has used a rogue scanner.

According to a further preferred embodiment the result is provided unencrypted. One of the advantages is, that resources like computational resources for encryption are saved, since the result is provided unencrypted, i.e. in plaintext form. A further advantage is, that this does not reduce the security of the method since, for example, an untrusted fingerprint scanner is not able to require any meaningful information about the inputted fingerprint of the user.

According to a further preferred embodiment, the lifetime-information is provided in form of a nonce. A unique nonce, for example an incremental counter provides a very simple and easy-to-implement way to reflect the "freshness" respectively lifetime of the second terminal.

According to a further preferred embodiment, the result of step e) includes a result of a performed function on the lifetime-information. This enables to further increase the resilience of the method to possible guessing attacks.

According to a further preferred embodiment, the result of the performed function on the lifetime-information is provided to be human-readable. This enables for example users to an easy and quick recognition, if the first terminal is to be trusted, for example, a QR-codes/barcodes may be provided.

According to a preferred embodiment of the system, the protecting terminal is a pad, preferably a one-time pad. One of the advantages is, that the pad is lightweight and easy to transport even in high numbers. A further advantage of a pad is that it is very cost-effective.

According to a further preferred embodiment, the second input interface comprises optical means, preferably a camera. With a camera, for example, a pad encryption can be emulated. Since current mobile phone cameras are of very high precision a corresponding software on the mobile phone can take a photo of a fingerprint or other biometrical properties of a user, encrypt the image using pad-cryptography. The user may place the mobile phone, for example, on a fingerprint reader in order to transmit the encrypted fingerprint to the checking entity respectively the database. One of the further advantages of a camera is, that users nowadays have in general mobile phones equipped with a camera with sufficient resolution. Therefore users do not have to carry further hardware.

According to a further preferred embodiment, the pad, preferably the one-time pad, comprises a transparency layer. Each transparency layer present a one-time pad token used for encryption. For example, the user can easily acquire a set of transparencies from the government when registering its fingerprints and can use them one at a time subsequently.

According to a further preferred embodiment, steps a)-i) are performed at least twice. This further reduces the impersonation probability of the method.

FIG. 1 shows different biometrical property data with corresponding data identifiers according to an embodiment of the present invention. In FIG. 1, indices of fingers denoted with "1", "2", . . . of the left and right hand corresponding to the fingerprints of the respective fingers of a human user are shown.

Figure 2:
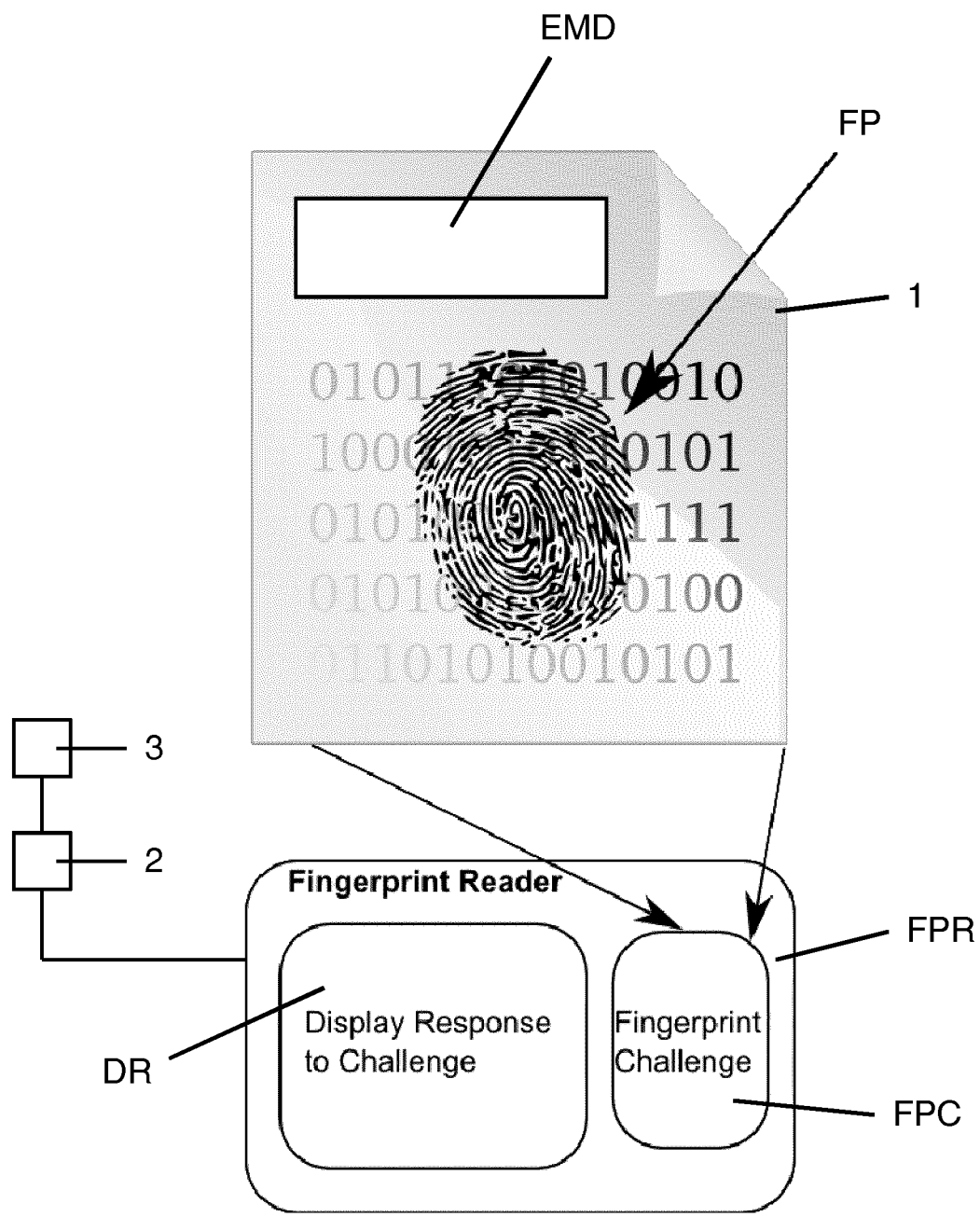
FIG. 2 shows a system according to an embodiment of the present invention.

FIG. 2 shows a system according to an embodiment of the present invention. In FIG. 2, a fingerprint reader FPR is shown. The fingerprint reader is connected to a checking entity 2 and the checking entity 2 is further connected to a database 3. In the database 3 fingerprints of the fingers of the left and right hand according to FIG. 1 as well as the corresponding indices are stored. Further the fingerprint reader FPR comprises a display response region DR for displaying a response corresponding to a challenge and a second region FPC for fingerprint challenge.

When the user would like to use the fingerprint reader FPR the user first takes his one-time pad 1 together with encrypted metadata EMD stored on it and puts on the one-time pad 1 its fingerprint FP. The one-time pad 1 encodes and encrypts the fingerprint data. When the user then submits its encrypted fingerprint and the metadata EMD via the one-time pad 1 i.e. puts the one-time pad 1 on the fingerprint challenge region FPC of the fingerprint reader FPR, the fingerprint reader FPR encodes a corresponding challenge to the database 3. This challenge provides an encrypted fingerprint of any of the finger indices or any combination of pairs of these indices, for example chosen at random.

Upon receiving the fingerprint challenge FPC the database 3 performs a fingerprint matching algorithm after it has decrypted the encrypted metadata and the encrypted fingerprint data. A result of the fingerprint matching algorithm is used for response including the number of the finger indices that the user has used. This response maybe sent in plaintext form and displayed to the user using a display of the fingerprint reader FPR. If the user sees in the display of the fingerprint reader FPR a response that matches the fingerprint challenge FPC the user may assume that the fingerprint reader communicates with a correct checking entity 2 and database 3.

In this way an untrusted fingerprint reader cannot trick with overwhelming probability any user to submit its fingerprint without communicating the fingerprint immediately to the database 3. Although the response of the database 3 or the checking entity 2 may be sent in plaintext form an untrusted fingerprint reader is not able to extract any meaningful information about the fingerprint inputted by the user. Even if the checking entity 2 does not find a match in the database 3 for the fingerprint FP, the checking entity 2 outputs a plaintext answer to the randomly from a set of possible answers.

To provide encryption the checking entity 2 respectively the database 3 and the one-time pad 1 may be provided with corresponding public/private keys, for example for each one-time pad 1 a seed s is chosen uniformly at random. The one-time pad encryption may be then G(s). The "encrypted metadata" of the one-time pad is then $C=F_{encrypted, PK}(s, N, server)$, where N denotes a unique nonce, for example an incremental counter to reflect the freshness of the one-time pad 1, "server" is an ID of the checking entity 2 and F is the function to perform the encryption. After receiving the encrypted metadata C the checking entity 2 may then easily recover the encrypted fingerprint using its private key and the "encrypted metadata" field in the transmitted biometrical information. The checking entity 2 may then check the database 3 for matching fingerprints. The checking entity 2 outputs then a response to the user challenge FPC. For example, a probability that an adversary that does not know a priori the fingerprints of fingers with corresponding indexes for example 2, 3, 4, 7, 8, 9 in guessing the response is bounded by 1/42=2,4%. This computation is specific to the case where users rely on a camera snapshot; since fingerprints of each finger index are stored in the database 3 the user may decode the same fingerprint twice within one fingerprint challenge FPC, hence a total of 42 possibilities. The user can repeat the protocol many times to reduce the probability of guessing. Further, for example, more than 2 fingers may be inputted and then checked by the checking entity 2 which also then reduces the probability of guessing.

In summary, an embodiment of the present invention provides a biometrical protector to achieve full privacy/secrecy in biometrical extraction, in particular of fingerprints. An embodiment of the present invention further enables constructing a stateless one-time pad protector wherein a key to decrypt the biometrical protector is encoded within the biometrical protector itself in the EMD field. An embodiment of the present invention further provides encrypting the biometrical input by users as a challenge/response mechanism to enable mutual authentication between end parties, i.e. the checking entity and the one-time pad.

An embodiment of the present invention enables privacy-preserving biometric extraction in spite of untrusted biometric readers as well as a mutual authentication between users and checking entities, for example database servers without the need to agree on secrets using and untrusted biometric reader. An embodiment of the present invention does not require considerable modification to existing biometrical readers and to the operation of databases. An embodiment of the present invention does not penalize non-privacy aware users. Users that do not wish to follow the method according to an embodiment of the present invention may simply use conventional insecure biometrical identification.

An embodiment of the present invention increases the trust of users in biometrical readers as means to support their large scale deployment. An embodiment of the present invention prevents impersonation of biometrical information by means of replay attacks. An embodiment of the present invention ensures full secrecy of the biometrical properties to any external party, i.e. that is neither the user nor the checking entity and/or database. An embodiment of the present invention ensures mutual authentication between end parties without requiring modifications/changes to the current operation of biometrical readers, in particular fingerprint readers. An embodiment of the present invention can be easily implemented with conventional methods and systems installed on the database or checking entity side to ensure privacy-preserving biometrical property matching.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention is not solely specific to fingerprints, but can although be used to enable the secure and privacy-preserving retinal scan/extraction. Other biometrics such as voice recognition, etc. may also be used.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for biometrical identification of a user, the method comprising:
   a) receiving, from a user, data representing one or more biometrical properties of the user, wherein an association has been preestablished between the one or more biometrical properties and biometrical property identifiers that identify individual ones of the one or more biometrical properties,
   b) encoding the data representing the one or more received biometrical properties of the user,
   c) sending, to a database, the encoded data representing the one or more received biometrical properties as a biometrical challenge to the database,
   d) checking the encoded data representing the one or more received biometrical properties against the preestablished association to determine, as a response to the biometrical challenge, one or more biometrical property identifiers that correspond to the one or more received biometrical properties,
   e) checking the encoded data representing the one or more received biometrical properties against biometrical user information stored at the database to identify the user,
   f) displaying, as a response to the biometrical challenge, the one or more determined biometrical property identifiers for verification of the database by a verifying entity,
   g) encrypting the received biometrical properties of the user prior to step b), and
   h) decrypting the encoded data representing the one or more biometrical properties for performing step d).

2. The method according to claim 1, further comprising adding metadata-information to the encoded data representing the one or more received biometrical properties.

3. The method according to claim 2, wherein the metadata-information includes lifetime-information.

4. The method according to claim 1, wherein receiving one or more biometrical properties of the user comprises receiving a plurality of biometrical properties of the user.

5. The method according to claim 4, wherein the plurality of biometrical properties of the user are provided in a sequence, and
   wherein the displaying the one or more determined biometrical property identifiers for verification of the database by a verifying entity comprises displaying a plurality of determined biometrical property identifiers in the same sequence.

6. The method according to claim 1, wherein the displaying the one or more determined biometrical property identifiers for verification of the database by a verifying entity comprises displaying the determined biometrical property identifiers unencrypted.

7. The method according to claim 3, wherein lifetime-information is provided in a form of a nonce.

8. The method according to claim 3, wherein the result of step e) is based on a performed function on the lifetime-information.

9. The method according to claim 8, wherein the result of the performed function on the lifetime-information is provided in a human-readable form.

10. The method according to claim 1, wherein steps a)-h) are performed at least twice.

11. A system for biometrical identification of a user, the system comprising:
- a first terminal comprising an input interface, an output interface, computing hardware, and a non-transitory computer-readable storage medium including computer executable instructions executed by the computing hardware to perform a method comprising:
  a) receiving, at the input interface from the user, data representing one or more biometrical properties of the user, wherein an association has been preestablished between the one or more biometrical properties and biometrical property identifiers that identify individual ones of the one or more individual biometrical properties,
  b) encoding the data representing the one or more received biometrical properties of the user,
  c) sending to a database as a biometrical challenge, the encoded data representing the one or more received biometrical properties to be:
    i) checked against the preestablished association to determine, as a response to the biometrical challenge, one or more biometrical property identifiers that correspond to the one or more received biometrical properties,
    and
    ii) checked against biometrical user information stored at the a database to identify the user,
  d) receiving a response to the biometrical challenge including the one or more biometrical property identifiers that correspond to the one or more received biometrical properties of the user and an identification of the user, and
  e) outputting the response to the biometrical challenge from the output interface;
- a protecting terminal being configured to encrypt one or more provided biometrical properties of the user and being connected to the first terminal, the protecting terminal comprising:
  a2) a second input interface configured to receive the one or more provided biometrical properties of the user as an input, and
  b2) a second output interface connected to the input interface of the first terminal and configured to output the encrypted one or more provided biometrical properties of the user as the biometrical challenge including the data representing the one or more biometrical properties of the user; and
- a display configured to display, as a response to the biometrical challenge, the one or more determined biometrical property identifiers for verification of the database by a verifying entity, wherein the encoded data representing the one or more biometrical properties is decrypted prior to being checked against the corresponding biometrical user information stored at the database.

12. The system according to claim 11, wherein the protecting terminal is a pad.

13. The system according to claim 11, wherein the second input interface comprises an optical means device.

14. The system according to claim 12, wherein the pad comprises a transparency layer.

15. The method according to claim 2, wherein the meta-data-information is encrypted.

16. The system according to claim 12, wherein the pad is a one-time pad.

17. The system according to claim 13, wherein the optical device is a camera.

18. The method according to claim 1, wherein the verifying entity is the user.

19. The system according to claim 11, wherein the verifying entity is the user.

* * * * *